Nov. 21, 1961

R. W. CARNEY 3,010,032

TRIGGERED TRANSISTORIZED BLOCKING OSCILLATOR
WITH SATURABLE TRANSFORMER

Filed March 7, 1957

INVENTOR:
ROBERT W. CARNEY,

BY Hugo M. Wikstrom

HIS ATTORNEY.

United States Patent Office 3,010,032

Patented Nov. 21, 1961

3,010,032

TRIGGERED TRANSISTORIZED BLOCKING OSCILLATOR WITH SATURABLE TRANSFORMER

Robert William Carney, Utica, N.Y., assignor to General Electric Company, a corporation of New York Filed Mar. 7, 1957, Ser. No. 644,625

3 Claims. (Cl. 307—88.5)

This invention relates to the art of accurately controlled oscillator circuits, and more particularly to the art of triggered blocking oscillators employing semiconductor devices.

In many control and computing applications it is desirable to generate pulses of predetermined amplitude and width in response to a triggering pulse of variable amplitude and width. Such circuits find application in control circuits for the operation of gating devices and in time delay circuits in combination with differentiating circuits known to the art. In such circuits the use of semiconductor devices has advantages in the simplicity of power supplies and in the decrease of weight and size of utilizing equipments. However, the fact that transistor parameters vary with changed operating conditions such as temperature, and that transistor parameters vary widely from transistor to transistor, has prevented use of these devices in simple circuits for accurate generation of long width pulses.

It is, therefore, one object of my invention to provide a simple transistor circuit capable of generation of accurate pulses.

It is another object of my invention to provide a simple blocking oscillator circuit.

It is a further object of my invention to provide an improved signal processing circuit.

It is another object of my invention to provide improved method and means for the generation of pulses of predetermined amplitude and pulse width.

In accordance with these objects I have provided in one embodiment of my invention a transistor biased to cut-off in the quiescent condition. The application of a triggering pulse to the base electrode initiates conduction. A saturable core transformer is connected so that this conduction current flows through the primary. The secondary winding is connected for positive feedback of the voltage generated across the primary to the base electrode. The hysteresis curve of the core material will then control the voltage generated across the primary, and, thus, the conduction controlling feedback voltage.

In another embodiment of my invention I have limited the voltage generated across the primary winding for more accurate control of the conduction current.

In another embodiment of my invention I limit the voltage generated across the primary of a saturable core transformer for use in generation of a positive feedback signal. The output pulse generated by conduction of the transistor is then accurately controlled in accordance with the hysteresis loop of the feedback transformer.

The features of my invention, which I believe to be novel, are set forth with particularity in the appended claims. My invention, itself, however, both as to its organization and method of operation, together with other objects and advantages, may best be understood by reference to the following description taken in connection with the accompanying drawings, in which:

Figure 1:
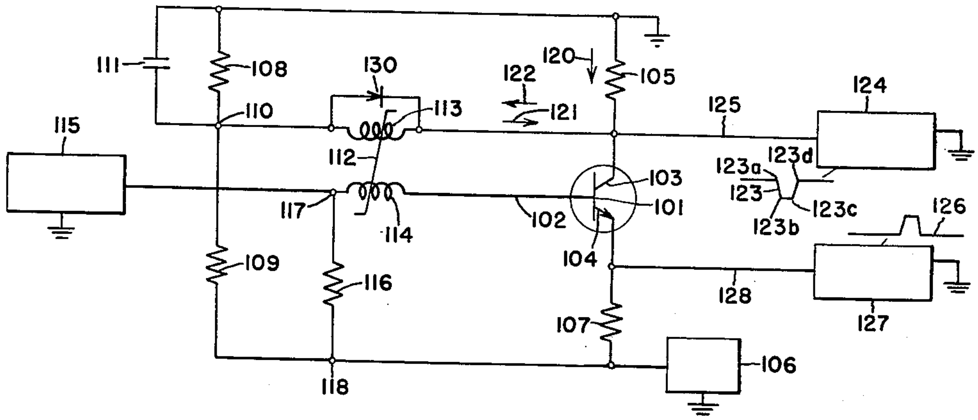
FIGURE 1 is a schematic diagram of one embodiment of my invention.

In FIGURE 1 there is shown a junction transistor 101 of the NPN type having a base electrode 102, a collector electrode 103 and an emitter electrode 104. The collector electrode is connected to ground through resistor 105. The emitter electrode is connected to source of negative potential 106 through resistor 107. Resistors 108 and 109, connected between source 106 and ground act in combination with resistor 105 as a voltage divider to maintain the potential at the junction 110 at a predetermined level. Transient fluctuations at junction 110 are bypassed to ground by capacitor 111 to prevent unwanted variations in voltage.

A saturable core transformer 112 having a primary winding 113 and a secondary winding 114 is employed in the circuit for voltage regeneration. The primary winding is connected between the collector electrode 103 and junction 110. The secondary winding 114 is connected between the base electrode 102 and a source of triggering pulses 115. Resistor 116 is connected between junction 117 and junction 118 to complete the circuit loop.

Figure 2:
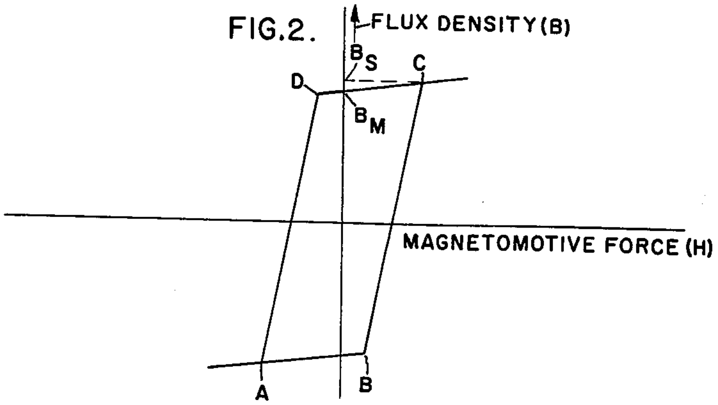
FIGURE 2 is a plot of desired characteristics of the transformer core used in the circuit of FIGURE 1.

The saturable core transformer preferably has a rectangular hysteresis loop shown in idealized form in FIGURE 2.

In FIGURE 2 there is shown the hysteresis curve of material suitable for use in saturable core transformers wherein flux density is plotted on a representative ordinate scale as a function of magnetizing force plotted on a representative abscissa scale. Desirable characteristics of this loop are a high residual flux density, high saturation flux density, and low coercive force.

The operation of circuit in FIGURE 1 is best explained by reference to FIGURES 1 and 2 together. Initially, the core of the transformer 112 is at point A on its hysteresis curve. In the quiescent state both the emitter electrode 104 and the base electrode 102 are at the potential of source 106. Therefore, the transistor is cut off. The collector electrode 103 and junction 110 are at a negative biasing potential. The application of a positive triggering pulse from source 115 will initiate conduction of the transistor 101. The conduction current will be supplied through resistor 105, represented by arrow 120 and through the primary winding 113 of transformer 112, represented by arrow 121.

The current flow through the primary winding 113 will develop a voltage across the primary winding, and, as a result, across the secondary winding 114. The secondary winding is so phased with respect to the primary that the secondary voltage drives the base electrode 102 positive with respect to the junction 117. Thus positive feedback is developed.

Buildup of current 121 will cause the core to move into the unsaturated region of the hysteresis curve. The equivalent impedance of the primary winding will rapidly increase. This increase will be accompanied by rapid increase of voltage across the primary and secondary windings. By properly dimensioning the components, the loop gain during the rapid increase is greater than unity and the termination of the triggering pulse will have no effect.

The voltage at the collector electrode 103 is represented by curve 123. The quiescent voltage is represented by the portion to point 123a on the curve. The application of the triggering pulse initiates conduction of the transistor, accompanied by a drop in potential of the collector electrode caused by the conduction current. The rapid increase of bias applied to the base electrode by the feedback voltage on the transformer secondary winding 114 causes change of transistor conduction from cut off to a maximum current conduction. This rapid increase is represented by the steep wavefront between points 123*a* and 123*b*. The voltage of the collector electrode 103 will drop to a value dependent upon the voltage drops in the resistors 105 and 107, transformer winding 113, and the drop in the transistor between source 106 and ground.

As current continues to flow through the primary winding 113, the core will move to point C on the hysteresis curve. When it reaches this point, the core will begin to saturate, and the equivalent impedance will drop. The impedance drop will cause a decrease in the voltage across both the primary and secondary. The decrease in secondary voltage will decrease transistor conduction. The conduction decrease will further reduce the voltage across the primary. The effect, therefore, of the positive feedback in the negative direction is to rapidly drive the transistor to cutoff.

The rapid cutoff of the transistor is reflected at the collector electrode by rapid rise to the quiescent voltage as indicated by the portion between points 123*c* and 123*d* on the curve 123. The rise in potential at the collector electrode will result in flow of current towards junction 110 which is at a fixed potential. This current is indicated by arrow 122 and drives the core to saturation as indicated by point A, the initial point assumed in this discussion.

The voltage pulse at collector electrode 103 may be applied to an output utilization device 124 over connection 125. It will be apparent to those skilled in the art that a positive voltage pulse is generated at electrode 104. This pulse is indicated by curve 126 and may be applied to an output utilization device 127 over connection 128.

While the circuit of FIGURE 1 will operate efficiently to reproducibly generate pulse outputs of desired amplitude and pulse width when operating under the same operating conditions, I have provided means for assuring generation of desired pulses under changed operating conditions and changed circuit parameters. It will be apparent to those skilled in the art that the present transistors have parameters which vary widely from unit to unit. Further, the parameters of each unit vary with temperature. Finally, in such circuits it is desirable to make the output independent of variations in supply voltage. To attain this desired stability, I have connected a voltage limiting device 130 across the primary winding 113 of transformer 112. This voltage limiting device might be a semi-conductor diode operated in the zener region. For the purpose of understanding the operation of the voltage limiting device in stabilization, it is desirable to examine the core flux generation in greater detail.

The average voltage induced across the primary is given by Equation 1.

Equation 1

$$E=N_P\frac{\Delta\phi}{\Delta t}\times 10^{-8}$$

where

E is in volts $N_P$ is the number of turns on the primary winding $\phi$ is the flux in maxwells Since the core is driven from saturation flux density in one direction to saturation flux density in the other direction, the change in flux is given by Equation 2.

Equation 2

$$\Delta\phi\approx 2B_sA$$

Where

A is the area in cm.$^2$ $B_s$ is the saturating flux density in gausses.

Therefore, by substituting Equation 2 into Equation 1 and solving for $\Delta t$, Equation 3 is obtained.

Equation 3

$$\Delta t=\frac{2N_pAB_s\times 10^{-8}}{E}=\frac{K}{E}$$

where K is an arbitrary constant.

From Equation 3 it can be seen that by limiting the voltage induced across the primary winding, the time required for core to switch from saturation in one direction to saturation in the other direction is fixed. Since the pulse width of the output pulse depends upon the total switching time, the output pulse width is controlled despite variation in supply voltage or transistor characteristics.

For the purposes of facilitating practice of the invention, but not as a limitation on the scope of my invention, component values of a representative circuit are given in Table I.

*Table I*

| Component (Fig. 1) | Value of Description |
|---|---|
| 101 | NPN junction transistor, 30 volt rating. |
| 107 | 82 ohm. |
| 105 | 3.9K ohm. |
| 108 | 30K ohm. |
| 109 | 6.8K ohm. |
| 116 | 430 ohm. |
| 111 | 1 microfarad. |
| 130 | zener diode—8 volt breakdown. |
| 113 | 130 turns. |
| 114 | 65 turns. |
| 120 | pulse amplitude—greater than 3 volts.<br>pulse width—greater than 0.5 microsecond. |

A circuit with the components listed in Table I produced a pulse output having an amplitude of 8 volts and a width of 13 microseconds. Maximum deviation of pulse width from room temperature value of a single transistor was less than 10% despite variation in temperature from −55° C. to +100° C., variation in supply voltage of ±20%, and insertion of different transistors having a $\beta_{dc}$ spread from 16 to 81, $\beta_{dc}$ being a ratio of collector current to base current.

It will be apparent to those skilled in the art that pulses of greater amplitudes can be obtained simply by using higher rating transistors and higher supply voltages. The higher voltages induced in the primary must be limited by serially connected zener diodes or equivalent means. With the use of higher currents, it is sometimes desirable to shunt resistor 107 with a bypass capacitor to increase the loop gain of the circuit limitation.

It will also be apparent to those skilled in the art that the transistor may be triggered at the collector without detrimental effects.

Figure 3:
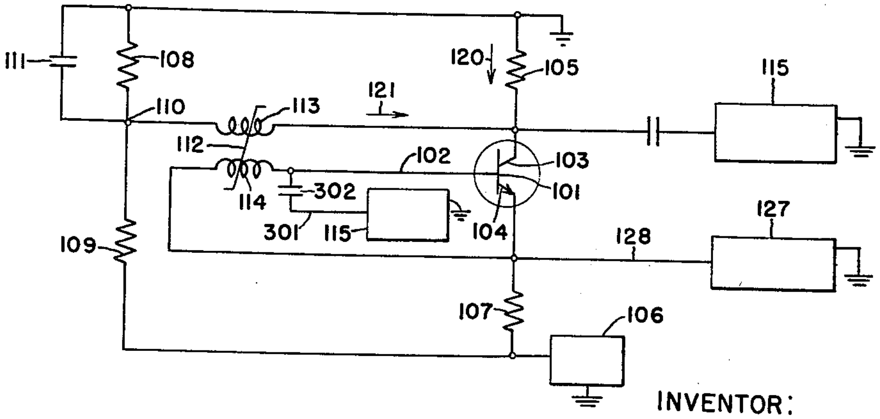
FIGURE 3 is a schematic diagram of another embodiment of my invention.

In many applications it is desirable to generate extremely long pulses in response to the trigger impulse. For such applications the circuitry of FIGURE 3 may advantageously be employed. In FIGURE 3 parts similar to those shown in FIGURE 1 are identically numbered.

In FIGURE 3 there is shown a transistor 101 biased to cut off in the quiescent condition in the same manner as shown in FIGURE 1. The saturable core transformer serves as a source of feedback voltage for the generation of long output pulses. However, in the circuit of FIGURE 3 the secondary winding 114 is connected directly between the base electrode 102 and the emitter electrode 104. When a triggering pulse is applied, as for example, to the base electrode 102, by source 115 over lead 301 which may include a blocking capacitor 302, the transistor will draw conduction current. In similar manner to that explained in connection with the operation of FIGURE 1, the conduction current will be drawn through the primary winding as illustrated by arrow 121. The secondary winding 114 is so phased as to establish positive feedback, or application of the voltage tending to make the base electrode positive with respect to the emitter electrode. The operation of the circuit in generating a pulse output is exactly the same as that described in connection with FIGURE 1.

However, the length of the pulse is much greater than that obtainable from the circuit of FIGURE 1 since the equivalent impedance of the primary winding is low. In the circuit of FIGURE 3 the load impedance for the secondary winding 114 of transformer 112 is that of the equivalent resistance of the transistor measured between the base and emitter electrodes. As will be evident to those skilled in the art, this resistance is far lower than the load impedance of the transformer secondary when connected in the circuit configuration of FIGURE 1. Therefore, the equivalent impedance of the primary winding is very low, and a small voltage is induced across it. Thus, in accordance with Equation 3 the output pulse width is very long.

It will be apparent to those skilled in the art that regulation of the output pulse width may be accomplished through the means of a voltage limiting device connected in shunt with the primary winding for accurate control of the pulse width in the manner explained in connection with the operation of the circuit in FIGURE 1. However, utilization of semi-conductor diodes operating in the zener region is not practical under all conditions of operation. This is due to the fact that zener diodes of extremely low rating are not available and the voltage generated across the primary winding will in many cases be of the order of magnitude of two volts. However, it will be apparent to those skilled in the art that the reproducibility of the pulse width generated by the circuit will be of the order of accuracy useful for most applications.

It will be apparent to those skilled in the art that this invention may be used with other electron discharge devices such as electron tubes. A tube can be substituted in the circuit by connecting the plate in place of the collector electrode, the cathode in place of the emitter electrode, and the grid in place of the base electrode. Substitution of tubes will in general cause larger voltage to be generated across the primary of the transformer. In the circuit of FIGNRE 1 limitation of the voltage across the primary is not feasible by zener diodes since semi-conductor devices with controlled zener characteristics above eight volts are not available in the present art. Other limiting devices may be used, as will be apparent to those skilled in the art. However, the configuration shown in FIGURE 3 may readily be used for control of the pulse width generated by an electron tube since the lower primary voltage makes the circuit more susceptible to control by zener diode limiting devices. It will be apparent to those skilled in the art that the use of tubes as well as transistors could entail a substitution of a positive B+ supply in place of the ground of the circuits shown with the source of negative voltage 106 being replaced by a ground connection.

While particular embodiments of the present invention have been shown and described, it will be obvious to those skilled in the art that changes and modifications may be made without departing from the invention in its broader aspects, and, therefore, the aim in the appended claims is to cover all such changes and modifications that fall within the true spirit and scope of the invention.

What is claimed is:

1. In combination, a transistor having base, collector, and emitter electrodes, a source of biasing potential, resistor means coupling said emitter electrode to said biasing potential, resistor means coupling said collector electrode to a ground potential, a saturable core transformer having a primary and secondary winding, means coupling said primary winding between said collector electrode and said ground potential, means coupling said secondary winding between said base electrode and said biasing potential with such polarity as to drive said base electrode positively in response to conduction current flow in said primary, a source of trigger pulses, and means coupling said source to said base electrode.

2. In combination, a transistor having base, collector and emitter electrodes, a source of biasing potential, resistor means coupling said emitter electrode to said biasing potential, resistor means coupling said collector electrode to a ground potential, a saturable core transformer having a primary and secondary winding, means coupling said primary winding between said collector electrode and said ground potential, means coupling said secondary winding between said base electrode and said biasing potential with such polarity as to drive said base electrode positively in response to conduction current flow in said primary, means to limit the voltage generated across said primary winding, a source of trigger pulses, and means coupling said source to said base electrode.

3. In combination, a transistor having base, collector and emitter electrodes, a source of biasing potential, resistor means coupling said emitter electrode to said biasing potential, resistor means coupling said collector electrode to a ground potential, a saturable core transformer having a primary and secondary winding, means coupling said primary winding between said collector electrode and said ground potential, means coupling said secondary winding between said base and emitter electrodes with such polarity as to drive said base electrode positive with respect to said emitter electrode in response to conduction current flow in said primary, a source of trigger pulses, and means coupling said source to said base electrode.

References Cited in the file of this patent

UNITED STATES PATENTS

| | | |
|---|---|---|
| 2,745,012 | Felker | May 8, 1956 |
| 2,757,243 | Thomas | July 31, 1956 |
| 2,758,206 | Hamilton | Aug. 7, 1956 |
| 2,759,111 | Wideroe | Aug. 14, 1956 |
| 2,774,878 | Jensen | Dec. 18, 1956 |
| 2,776,375 | Keiper | Jan. 1, 1957 |
| 2,777,092 | Mandelkorn | Jan. 8, 1957 |
| 2,848,613 | Green et al. | Aug. 19, 1958 |
| 2,857,518 | Reed | Oct. 21, 1958 |

FOREIGN PATENTS

| | | |
|---|---|---|
| 1,122,426 | France | May 22, 1956 |